United States Patent
Tominaga et al.

(10) Patent No.: US 11,643,554 B2
(45) Date of Patent: May 9, 2023

(54) COMPOSITE RESIN GRANULES AND METHOD FOR PRODUCING THE SAME, AND THERMALLY CONDUCTIVE RESIN MOLDED BODY USING COMPOSITE RESIN GRANULES AND METHOD FOR PRODUCING THERMALLY CONDUCTIVE RESIN MOLDED BODY

(71) Applicants: National Institute of Advanced Industrial Science and Technology, Tokyo (JP); Fuji Polymer Industries Co., Ltd., Nagoya (JP)

(72) Inventors: Yuichi Tominaga, Aichi (JP); Yoshiki Sugimoto, Aichi (JP); Yusuke Imai, Aichi (JP); Yuji Hotta, Aichi (JP); Setsuo Kikuchi, Aichi (JP); Makoto Iwai, Aichi (JP); Takumi Kataishi, Aichi (JP)

(73) Assignees: National Institute of Advanced Industrial Science and Technology, Tokyo (JP); Fuji Polymer Industries Co., Ltd., Aichi (JP)

( * ) Notice: Subject to any disclaimer, the term of this patent is extended or adjusted under 35 U.S.C. 154(b) by 318 days.

(21) Appl. No.: 16/863,526

(22) Filed: Apr. 30, 2020

(65) Prior Publication Data
US 2020/0377728 A1    Dec. 3, 2020

(30) Foreign Application Priority Data
May 31, 2019    (JP) .............................. JP2019-102255

(51) Int. Cl.
*C08L 83/04*    (2006.01)
*C08K 7/04*    (2006.01)
(Continued)

(52) U.S. Cl.
CPC .............. *C08L 83/04* (2013.01); *C08K 3/042* (2017.05); *C08K 3/14* (2013.01); *C08K 7/04* (2013.01);
(Continued)

(58) Field of Classification Search
CPC . C08K 3/38; C08K 3/04; C08K 3/042; C08K 2003/385; C08K 9/08; C08L 83/04
See application file for complete search history.

(56) References Cited

U.S. PATENT DOCUMENTS

| | | | |
|---|---|---|---|
| 2003/0064216 A1 | 4/2003 | Tobita et al. | |
| 2015/0090922 A1* | 4/2015 | Hatakeyama | ........... B29C 43/24 252/74 |

(Continued)

FOREIGN PATENT DOCUMENTS

| | | |
|---|---|---|
| JP | 2003-112915 | 4/2003 |
| JP | 2003-321554 | 11/2003 |

(Continued)

OTHER PUBLICATIONS

Machine translation of JP 2019-151754 (2019).*
(Continued)

*Primary Examiner* — Brieann R Johnston
(74) *Attorney, Agent, or Firm* — Hamre, Schumann, Mueller & Larson, P.C.

(57) ABSTRACT

Composite resin granules 5 contain a binder resin 2 and a thermally conductive filler. The thermally conductive filler includes a non-anisotropic thermally conductive filler 3 and an anisotropic thermally conductive filler 4. The composite resin granules containing the binder resin and the thermally conductive filler are formed into a spherical shape. The particles of the anisotropic thermally conductive filler 4 are oriented in random directions. A thermally conductive rein molded body 6 of the present invention is obtained by
(Continued)

compressing the composite resin granules 5. Thus, the present invention provides the thermally conductive resin molded body that has relatively high thermal conductivities in the in-plane direction and the thickness direction, well-balanced directional properties of thermal conduction, and a low specific gravity, the composite resin granules suitable for the thermally conductive resin molded body, and methods for producing them.

9 Claims, 4 Drawing Sheets

(51) Int. Cl.
    *C08K 3/04*           (2006.01)
    *C08K 3/38*           (2006.01)
    *C08K 3/14*           (2006.01)
    *C08K 3/22*           (2006.01)
    *C08K 3/28*           (2006.01)

(52) U.S. Cl.
    CPC .. *C08K 2003/222* (2013.01); *C08K 2003/282* (2013.01); *C08K 2003/382* (2013.01); *C08K 2201/001* (2013.01); *C08L 2203/20* (2013.01)

(56) References Cited

U.S. PATENT DOCUMENTS

2015/0110985 A1    4/2015    Sakaguchi et al.
2015/0274930 A1*  10/2015   Jon .......................... C08K 3/38
                                                        423/290

FOREIGN PATENT DOCUMENTS

| JP | 2010-132856 | 6/2010 |
|---|---|---|
| JP | 2012-255055 | 12/2012 |
| JP | 2013-159748 | 8/2013 |
| JP | 2014-201687 | 10/2014 |
| JP | 2015-034269 | 2/2015 |
| JP | 2015-105282 | 6/2015 |
| JP | 2017-128476 | 7/2017 |
| JP | 2017-210383 | 11/2017 |
| JP | 2019151754 A * | 9/2019 |

OTHER PUBLICATIONS

PingYiao (Boron Nitride Powder Grade PT110, Momentive Performance Materials, 2007, 2 pages).*

Japanese Office Action issued in corresponding Japanese Patent Application No. 2020-069948, dated Feb. 13, 2023, 9 pages, machine translation provided.

* cited by examiner

COMPOSITE RESIN GRANULES AND METHOD FOR PRODUCING THE SAME, AND THERMALLY CONDUCTIVE RESIN MOLDED BODY USING COMPOSITE RESIN GRANULES AND METHOD FOR PRODUCING THERMALLY CONDUCTIVE RESIN MOLDED BODY

BACKGROUND OF THE INVENTION

1. Field of the Invention

The present invention relates to a thermally conductive resin molded body with reduced anisotropy of thermal conduction and a low specific gravity, and a method for producing the thermally conducive resin molded body. The present invention also relates to composite resin granules that are suitable as a material for the production of the thermally conductive resin molded body, and a method for producing the composite resin granules.

2. Description of Related Art

Because of the high integration and high density of electronic components mounted on, e.g., personal computers and vehicles, the amount of heat generated per unit area of an electronic component is increasing in recent years. Accordingly, there has been a growing demand for a high thermally conductive material that can achieve a higher thermal conductivity and release heat more quickly than a conventional heat dissipating material. Moreover, when the thermally conductive material is used for electrical insulation purposes, it is required to have high and stable electrical insulation properties even in a high operating temperature environment. On the other hand, there has also been a strong need to save energy by reducing the weight of the thermally conductive material. Thus, a composite material containing a material with a high thermal conductivity and a lightweight resin has been widely used. The resin serves as a binder of the composite material and has a low thermal conductivity. Therefore, the resin is combined with a high thermally conductive material to form a heat dissipating material, which is put to practical use in various fields. When the composite material is used as a heat dissipating member, the adhesion of the composite material with a heating element is important. For this reason, the composite material needs sufficient heat resistance to withstand the heat generated from the heating element, and the flexibility to be able to adhere to the heating element without leaving an air layer. The resin having both heat resistance and flexibility is generally used for this purpose.

In many cases, the high thermally conductive material can be a high thermally conductive ceramic filler, which is generally composed of aluminum oxide and may also contain other nitrides and zirconia oxides. Some high thermally conductive fillers have anisotropic shapes such as a plate and a rod. The anisotropic fillers may be effective in improving the thermal conductivity of a composite composition even at a low concentration. Thus, the anisotropic fillers are important as thermally conductive fillers. Among the anisotropic fillers, hexagonal boron nitride attracts attention. The hexagonal boron nitride has different thermal conductive properties in the major axis direction and the minor axis direction. The thermal conductivity of the hexagonal boron nitride is particularly high in the major axis direction. Specifically, the thermal conductivity in the major axis direction is 200 W/m·K, while the thermal conductivity in the minor axis (thickness) direction is 2 W/m·K. Therefore, a technology that utilizes such a high thermal conductivity in the major axis direction has been demanded. However, when the anisotropic thermally conductive filler is formed into a composite composition, particles of the filler may be oriented in accordance with the flow of a binder resin during the formation, so that the composite composition cannot have sufficient thermal conductive properties in the desired direction. To improve the thermal conductivity of the composite composition, e.g., Patent Documents 1 and 2 disclose technologies that allow the anisotropic thermally conductive filler contained in the composite composition to be oriented in the thickness direction of the composite composition. Moreover, Patent Documents 3 and 4 disclose technologies in which a molded body is formed such that the anisotropic thermally conductive filler is oriented in one direction, and then the molded body is secondary processed to have a high thermal conductivity in the desired direction. Further, Patent Document 5 discloses a secondary aggregate structure of the anisotropic thermally conductive filler in which particles are oriented in various directions, so that the aggregated filler is isotropic as a whole.

PRIOR ART DOCUMENTS

Patent Documents

Patent Document 1: JP 2003-321554
Patent Document 2: JP 2013-159748
Patent Document 3: JP 2010-003981
Patent Document 4: JP 2010-132856
Patent Document 5: JP 2003-112915

SUMMARY OF THE INVENTION

However, in the methods of Patent Documents 1 and 2, an electric field or a magnetic field is applied for the orientation of the anisotropic thermally conductive filler. This requires a special device and poses problems such as a high cost and a lack of versatility. Moreover, since the thermal conductivity in the in-plane direction may vary, the temperature is not uniform and a hot spot is likely to occur. In the methods of Patent Documents 3 and 4, the number of processes is increased, which leads to an increase in cost. In the method of Patent Document 5, there are fine gaps in the aggregate structure, and it is difficult to fill the gaps with a binder resin. Thus, the thermal conductivity of a composite material is reduced.

To solve the above conventional problems, the present invention provides a thermally conductive resin molded body that has relatively high thermal conductivities in the in-plane direction and the thickness direction, well-balanced directional properties of thermal conduction, and a low specific gravity, and a method for producing the thermally conductive resin molded body. The present invention also provides composite resin granules that are suitable as a material for the thermally conductive resin molded body, and a method for producing the composite resin granules.

Composite resin granules of the present invention contain a binder resin and a thermally conductive filler. The thermally conductive filler includes at least an anisotropic thermally conductive filler. A composition containing the binder resin and the thermally conductive filler is formed into granules. Particles of the anisotropic thermally conductive filler are oriented in random directions.

A method for producing composite resin granules of the present invention is a method for producing the above composite resin granules. The method includes the following: a first step of mixing a thermally conductive filler and a binder rein to form a resin paste composition; a second step of further adding a thermally conductive filler to the resin paste composition and stirring the mixture to form a thermally conductive resin composition; and forming the thermally conductive resin composition into a spherical shape by vibrational motion. An anisotropic thermally conductive filler is added in at least one of the first step and the second step.

A thermally conductive resin molded body of the present invention is obtained by molding the composite resin granules by at least one molding process selected from the group consisting of injection molding, extrusion molding, press molding, and vacuum press molding.

The present invention uses an anisotropic thermally conductive filler, a non-anisotropic thermally conductive filler, and a binder resin to form a thermally conductive resin molded body in which particles of the anisotropic thermally conductive filler are oriented in various directions. Thus, the present invention can provide the thermally conductive resin molded body that has relatively high thermal conductivities in the in-plane direction and the thickness direction, well-balanced directional properties of thermal conduction, and a low specific gravity. The present invention can also provide a method for producing the thermally conductive resin molded body. Moreover, the present invention can provide the composite resin granules that are suitable for the thermally conductive resin molded body, and a method for producing the composite resin granules. Further, the present invention can provide a composite resin molded body with high isotropic thermal conductive properties at a low cost.

DETAILED DESCRIPTION OF THE INVENTION

Figures 1A, 1B, 1C:
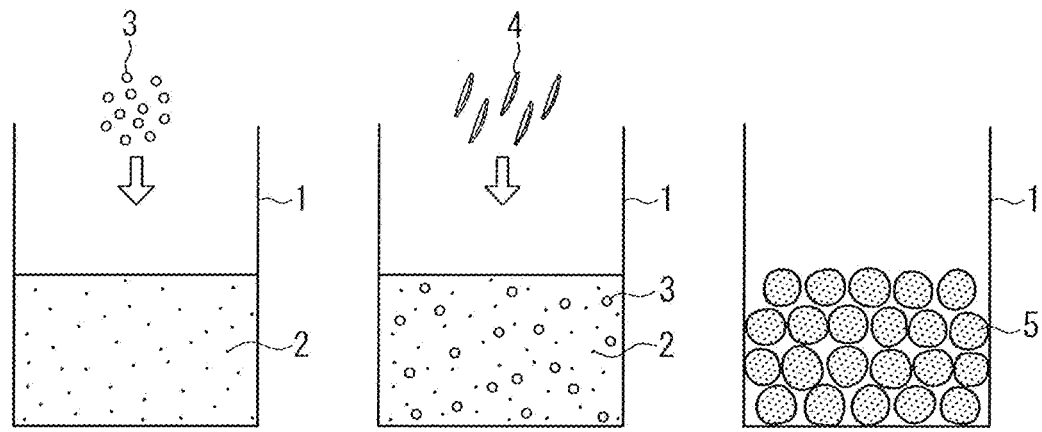
FIGS. 1A to 1D are schematic diagrams illustrating the production process of composite resin granules of an embodiment of the present invention.
Figure 1D:
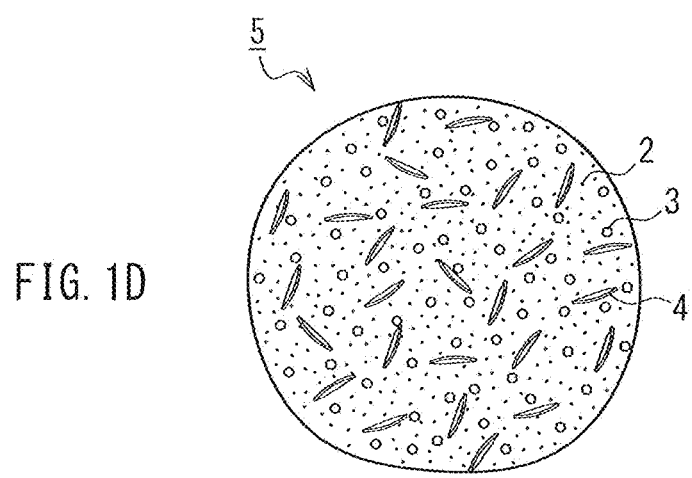

The present inventors conducted intensive studies to obtain a thermally conductive resin molded body that has relatively high thermal conductivities in the in-plane direction and the thickness direction, well-balanced directional properties of thermal conduction, and a low specific gravity. As a result, the present inventors found out a method for producing composite resin granules containing at least an anisotropic thermally conductive filler. The method includes the following: a first step of mixing a thermally conductive filler and a binder rein to form a resin paste composition; a second step of further adding a thermally conductive filler to the resin paste composition and stirring the mixture to form a thermally conductive resin composition; and forming the thermally conductive resin composition into a spherical shape by vibrational motion, in which an anisotropic thermally conductive filler is added in at least one of the first step and the second step. The method is able to provide the composite resin granules in which particles of the anisotropic thermally conductive filler are not oriented in one direction and are aggregated. The present inventors used these composite resin granules to produce a thermally conductive composite resin molded body and confirmed that the composite resin molded body thus obtained had low anisotropy and high thermal conductive properties. Based on these findings, the present inventors have reached the present invention.

Hereinafter, an embodiment of composite resin granules containing a thermally conductive filler and a binder resin will be described in detail. This embodiment shows how to prevent particles of an anisotropic thermally conductive filler from being oriented in one direction in the composite resin granules.

A filler is a particulate material that appears to be powdery when viewed macroscopically. The filler is mixed with a binder resin to form a composition. A thermally conductive filler is a type of filler that is superior in thermal conductive properties and has a higher thermal conductivity than the binder resin. The term "anisotropic shape" means that the length in the major axis direction differs from that in the minor axis direction of the individual particles when the filler is viewed microscopically. The anisotropic shape may be, e.g., a plate-like, scale-like, rod-like, needle-like, or fiber-like shape. When the anisotropic filler is in the form of a plate or scale, the thickness direction is regarded as the minor axis direction.

In the present invention, the major axis length of the anisotropic thermally conductive filler is preferably 0.1 µm or more and 500 µm or less, and more preferably 1 µm or more and 100 µm or less. When the major axis length is 0.1 µm or more, the formability is good and the filler can be filled with high density. When the major axis length is 500 µm or less, the particle size of the spherical composite resin composition can easily be controlled. Moreover, the ratio of the major axis length to the minor axis length, i.e., the aspect ratio is preferably 2.5 or more and 3000 or less. When the ratio is 3000 or less, the entanglement of particles of the filler can be reduced, and the composition can easily be formed into granules.

The anisotropic thermally conductive filler of the present invention is not particularly limited as long as it is anisotropic in shape and has a higher thermal conductivity than the binder resin. Examples of the anisotropic thermally conductive filler include hexagonal boron nitride, graphite, and graphene. These fillers may be used individually or in combinations of two or more.

In the present invention, the term "non-anisotropic shape" means that the ratio of the length in the major axis direction to the length in the minor axis direction (also referred to as the aspect ratio) of the individual particles is 2.5 or less. The non-anisotropic shape may be, e.g., a spherical, crushed, or lumpy shape. The filler with an aspect ratio of 2.5 or less is considered a non-anisotropic filler.

The particle diameter (median diameter) of the non-anisotropic thermally conductive filler of the present invention is preferably 1 nm or more and less than 0.1 mm. Moreover, the particle diameter (median diameter) of the non-anisotropic thermally conductive filler is preferably 100% or less of the major axis length of the anisotropic thermally conductive filler. When the particle diameter (median diameter) of the non-anisotropic thermally conductive filler is 100% or less of the major axis length of the anisotropic thermally conductive filler, the non-anisotropic thermally conductive filler can easily enter between the particles of the anisotropic thermally conductive filler, and thus the filler content can be increased. Further, non-anisotropic thermally conductive fillers with a different particle diameter (median diameter) may be mixed.

The non-anisotropic thermally conductive filler of the present invention is not particularly limited as long as it is non-anisotropic in shape and has a higher thermal conductivity than the binder resin. Examples of the non-anisotropic thermally conductive filler include carbon black, aluminum oxide, aluminum nitride, silicon nitride, magnesium oxide, and silicon carbide. These fillers may be used individually or in combinations of two or more.

The non-anisotropic thermally conductive filler does not necessarily need to be spherical and may deviate from a spherical shape or have an uneven surface. The shape of the non-anisotropic thermally conductive filler may include various spheres such as elliptical, oval, and lumpy spheres.

Any binder resin may be used as long as it is a curable resin that is liquid at room temperature and becomes solid at room temperature after a curing treatment. A thermosetting resin also includes rubber. Examples of the thermosetting resin include (but are not limited to) epoxy resin, phenol resin, unsaturated polyester resin, and melamine resin. Examples of the rubber include (but are not limited to) the following: natural rubber (NR: ASTM abbreviation); isoprene rubber (IR); butadiene rubber (BR); 1,2-polybutadiene rubber (1, 2-BR); styrene-butadiene rubber (SBR); chloroprene rubber (CR); nitrile rubber (NBR); butyl rubber (IIR); ethylene-propylene rubber (EPM, EPDM); chlorosulfonated polyethylene (CSM); acrylic rubber (ACM, ANM); epichlorohydrin rubber (CO, ECO); polysulfide rubber (T); silicone rubber (Q); fluorocarbon rubber (FKM); and urethane rubber (U). In particular, a silicone resin is preferred. The silicone resin has good properties such as high heat resistance and flexibility and is suitable for a heat dissipating sheet. For example, an addition curing type silicone resin, a peroxide curing type silicone resin, and a condensation type silicone resin may be used. A thermosetting silicone resin may be in any form (rubber, gel, resin, etc.) after curing.

The binder resin may contain additives such as a flame retardant, a stabilizer, a plasticizer, a surfactant, and a curing retarder to the extent that they are not contrary to the object of the present invention.

To determine the mixing ratio of two anisotropic and non-anisotropic thermally conductive fillers and the binder resin, the volume percentage of the fillers is preferably 30% to 95% by volume, and more preferably 50% by volume or more. When the filler content is 30% by volume or more, the contact between the fillers becomes better, and the thermal conductivity can be expected to be improved. In addition, the moldability of the composite resin granules can also be improved. When the filler content is 95% by volume or less, it is possible to suppress an increase in viscosity of the composite resin composition, thereby reducing the occurrence of a gap in a molded body. The presence of a gap in the molded body may degrade the properties such as strength and thermal conductivity, and therefore is not preferred.

The composite resin composition is formed into granules. The average diameter of the composite resin granules is preferably 0.01 mm or more and 5 mm or less, which is a spherical equivalent diameter. If the average diameter is less than 0.01 mm, the particle diameter of the filler is reduced, and thus the thermal conductivity of the composite resin molded body may not be improved due to the influence of interface thermal resistance. On the other hand, if the average diameter is more than 5 mm, the effect of improving the isotropy of the thermal conductive properties of the composite resin molded body is likely to be insufficient. In the present invention, the average of the diameters of 100 composite resin granules observed with a microscope is defined as an average diameter.

The composite resin granules do not necessarily need to be close to a sphere in shape and may deviate from a spherical shape or have an uneven surface. The composite resin granules may also have pores inside. The shape of the composite resin granules may include various spheres such as elliptical, oval, and lumpy spheres. The shape of the composite resin granules may be observed with, e.g., a light microscope or an electron microscope.

In the composite resin granules of the present invention, particles of the anisotropic thermally conductive filler are not oriented in one direction. Thus, the composite resin granules can have an isotropic thermal conductivity as a whole, even though they contain the anisotropic thermally conductive filler. The orientation of the particles of the anisotropic thermally conductive filler in the composite resin granules can be evaluated by observing the cross section of each of the composite resin granules with, e.g., an electron microscope. It is preferable that the particles of the anisotropic thermally conductive filler are aggregated. This can improve the thermal conductive properties.

The binder resin and either or both of the non-anisotropic thermally conductive filler and the anisotropic thermally conductive filler may be mixed by a known mixing means. For example, a kneader or a stirrer can be used to mix the liquid binder resin and the filler. The binder resin is generally composed of two or more components such as a base resin, a curing agent, and a curing accelerator. The order of mixing of these components of the binder resin does not matter when they are mixed with either or both of the non-anisotropic thermally conductive filler and the anisotropic thermally conductive filler. For example, first, the base resin, the curing agent, the curing accelerator, etc. may be mixed together at a predetermined ratio to prepare a binder resin, and then the binder resin may be mixed with the filler. Alternatively, the base resin and the filler may be mixed, to which, e.g., the curing agent and the curing accelerator may be added and further mixed.

The composite resin paste composition and either or both of the non-anisotropic thermally conductive filler and the anisotropic thermally conductive filler may be mixed by a known mixing means, including, e.g., a kneader, a stirrer, and a stirring rod.

The composite resin composition may be formed into granules by using, e.g., a shaker or a rotating container. Alternatively, a container containing the composition may be gently rotated by hand. The composition may be crushed by, e.g., a crusher to form very small composite resin granules.

The molding method for a thermally conductive resin molded body of the present invention is not particularly limited and may be any known method that is usually used for products containing a binder resin. The composite resin granules are molded into a desired shape by, e.g., injection molding, extrusion molding, press molding, or vacuum press molding, so that a molded body can be obtained. The spherical granules can be compressed by any of these molding methods. The particles of the anisotropic thermally conductive filler are oriented in random directions in the resulting molded body.

In the present invention, the random direction means that the particles of the anisotropic thermally conductive filler are oriented in various directions.

In the molding method for the thermally conductive resin molded body, the composite resin granules may be coated with the binder resin by using, e.g., an atomizer. Coating the composite resin granules with the binder resin can reduce a gap between the granules in the thermally conductive resin molded body.

The thermal conductivity in the thickness direction of the thermally conductive resin molded body is preferably 4.0 W/m·K or more and 300 W/m·K or less. The thermal conductivity in this range is sufficient for practical purposes. The thermally conductive resin molded body of the present invention has isotropic thermal conductive properties. The degree of isotropy can be evaluated by measuring the ratio of the thermal conductive properties in one direction to those in the other direction perpendicular to the one direction. For example, when the molded body is in the form of a disk, the thermal conductivities in both the in-plane direction and the thickness direction are evaluated. Then, the degree of isotropy of the disk-like molded body can be expressed as the ratio of the thermal conductivity in the in-plane direction to that in the thickness direction. In the present invention, the ratio (s/t) of the thermal conductivity in the in-plane direction (s) to the thermal conductivity in the thickness direction (t) of the thermally conductive resin molded body is preferably 0.6 or more and 1.5 or less.

The thermally conductive resin molded body has low directional properties of thermal conduction not only in the in-plane direction (s) and the thickness direction (t), but also in any direction (s1, s2) along the in-plane direction. The ratio (s1/s2) of the thermal conductivity in the direction (s1) to the thermal conductivity in the direction (s2) of the thermally conductive resin molded body is preferably 0.8 or more and 1.2 or less. In this case, the s1 direction is any direction along the in-plane direction of the thermally conductive resin molded body, and the s2 direction is a direction that is along the in-plane direction and is perpendicular to the s1 direction. Thus, the s1 direction and the s2 direction are perpendicular to the thickness direction. Since the thermal conductivity is the product of a thermal diffusivity, a specific heat, and a density, the ratio of the thermal diffusivities and the ratio of the thermal conductivities have the same meaning for the same thermally conductive resin molded body. Therefore, the ratio (s1/s2) of the thermal diffusivity in the direction (s1) to the thermal diffusivity in the direction (s2) is preferably 0.8 or more and 1.2 or less.

Figure 1E:
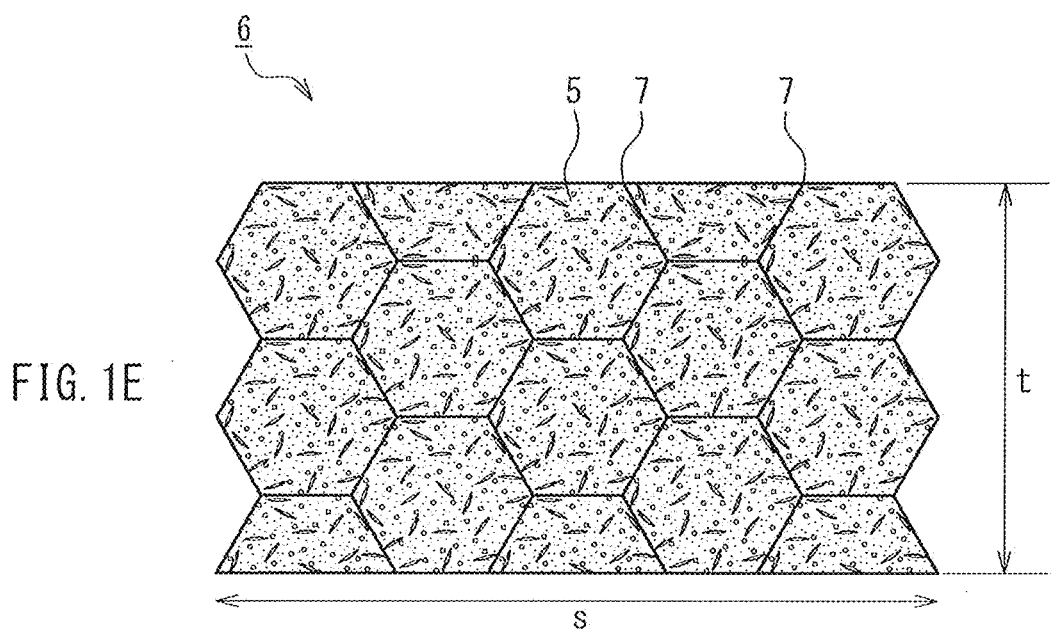
FIG. 1E is a schematic cross-sectional view of a thermally conductive resin molded body of an embodiment of the present invention.

Hereinafter, the present invention will be described with reference to the drawings. In the following drawings, the same components are denoted by the same reference numerals. FIGS. 1A to 1D are schematic diagrams illustrating the production process of composite resin granules of an embodiment of the present invention. FIG. 1E is a schematic cross-sectional view of a thermally conductive resin molded body of an embodiment of the present invention.

First, a binder resin 2 is placed in a container 1. Then, a non-anisotropic thermally conductive filler 3 is added and mixed with the binder resin 2 to form a resin paste composition (see FIG. 1A). Next, an anisotropic thermally conductive filler 4 is added to the resin paste composition and stirred (see FIG. 1B), resulting in a thermally conductive resin composition. The thermally conductive resin composition is lumpy at this stage, and subsequently formed into granules by vibrational motion (see FIG. 1C). In the composite resin granules 5 thus obtained, particles of the anisotropic thermally conductive filler 4 are oriented in random directions, and the non-anisotropic thermally conductive filler 3 is dispersed between the particles of the anisotropic thermally conductive filler 4 (see FIG. 1D). The composite resin granules 5 can be molded into a thermally conductive resin sheet 6 by compression (see FIG. 1E). The thermally conductive resin sheet 6 is cured at the same time as or after the molding process. The boundaries 7 between the composite resin granules 5 are observed in the thermally conductive resin sheet 6. The composite resin granules 5 are compressed and deformed so that each granule has a shape with corners. The particles of the anisotropic thermally conductive filler 4 in the individual composite resin granules 5 of the sheet 6 are oriented in random directions. Thus, the thermally conductive resin sheet 6 has relatively low directional properties of thermal conduction. Moreover, the ratio (s/t) of the thermal conductivity in the in-plane direction (s) to the thermal conductivity in the thickness direction (t) of the thermally conductive resin sheet 6 is preferably 0.6 or more and 1.5 or less.

EXAMPLES

Hereinafter, the present invention will be described in more detail by way of examples. However, the following examples only represent a part of the embodiment of the present invention. Thus, the present invention should not be interpreted as being limited to the examples.

<Average Diameter and Average Aspect Ratio of Composite Resin Granules>

Based on the observation of micrographs obtained from a stereoscopic microscope (using a 5× objective lens), the average of the diameters of 100 composite resin granules was defined as an average diameter. Moreover, the average of the aspect ratios (D1/D2) of 100 composite resin granules was defined as an average aspect ratio, where D1 represents the maximum diameter and D2 represents the diameter perpendicular to the maximum diameter D1 of each spherical granule.

<Thermal Conductivity>

Figure 6A:
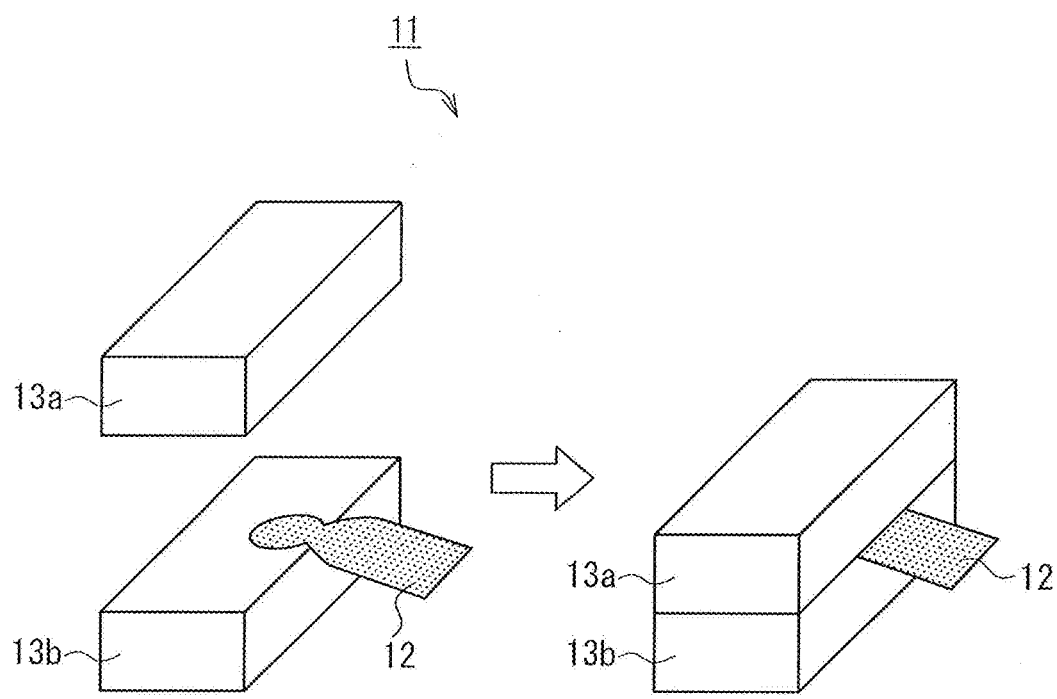
FIGS. 6A to 6B are diagrams illustrating a measuring method of a thermal conductivity used in an example of the present invention.
Figure 6B:
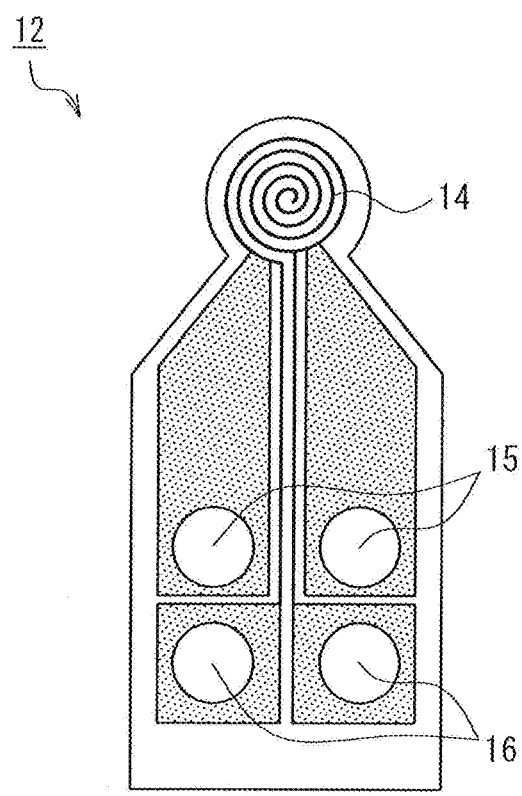

The thermal conductivity of a thermally conductive sheet was measured by a hot disk (in accordance with ISO/CD 22007-2). As shown in FIG. 6A, using a thermal conductivity measuring apparatus 11, a polyimide film sensor 12 was sandwiched between two thermally conductive sheet samples 13a, 13b, and constant power was applied to the sensor 12 to generate a certain amount of heat. Then, the thermal characteristics were analyzed from a temperature rise value of the sensor 12. The sensor 12 has a tip 14 with a diameter of 7 mm. As shown in FIG. 6B, the tip 14 has a double spiral structure of electrodes. Moreover, an electrode 15 for an applied current and an electrode 16 for a resistance value (temperature measurement electrode) are located on the lower portion of the sensor 12. The thermal conductivity was calculated by the following formula (1). The thermal conductivity in the in-plane direction was measured in the following manner. The sample was cut to pieces with a width of 8 mm, and then the pieces were stacked to form a laminated sheet. The laminated sheet was rotated 90 degrees and the thermal conductivity in the width (8 mm) direction was measured.

$$\lambda = \frac{P_0 \cdot D(\tau)}{\pi^{3/2} \cdot \Gamma} \cdot \frac{D(\tau)}{\Delta T(\tau)}$$ [Formula 1]

λ: Thermal conductivity (W/m·K)
P₀: Constant power (W)
r: Radius of sensor (m)
τ: $\sqrt{\alpha \cdot t / r^2}$
α: Thermal diffusivity of sample (m²/s)
t: Measuring time (s)
D(τ): Dimensionless function of τ
ΔT(τ): Temperature rise of sensor (K)
<Thermal Diffusivity>

The thermal diffusivity (s1, s2) of a thermally conductive sheet in Example 7 was measured by a thermal diffusivity measuring apparatus TA35 manufactured by BETHEL Co., Ltd.

Example 1

Figure 3:
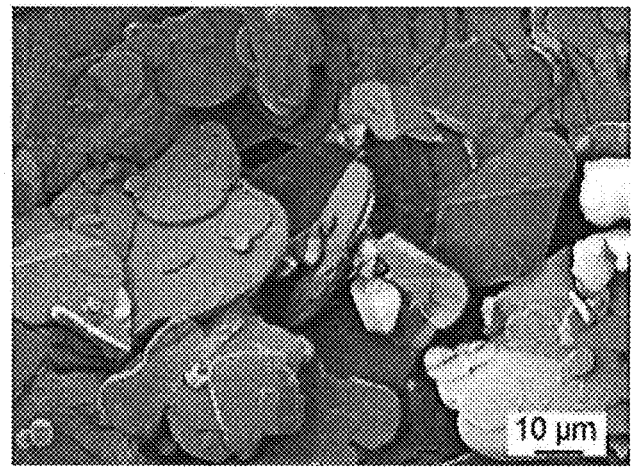
FIG. 3 is a photograph of an anisotropic thermally conductive filler used in an example of the present invention.
Figure 4:
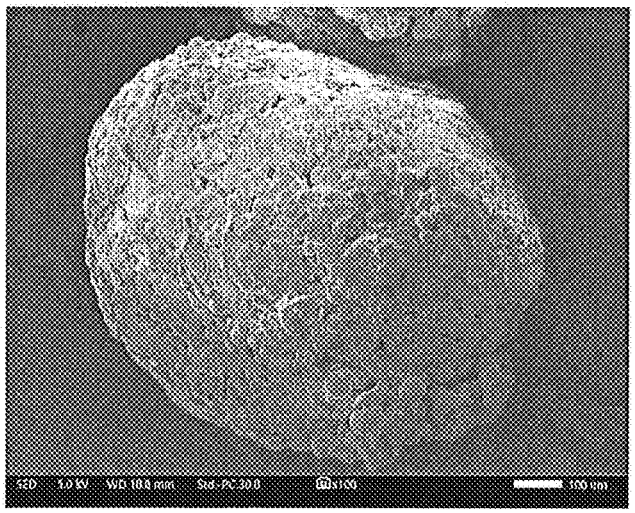
FIG. 4 is a photograph of a composite resin granule of an example of the present invention.
Figure 5:
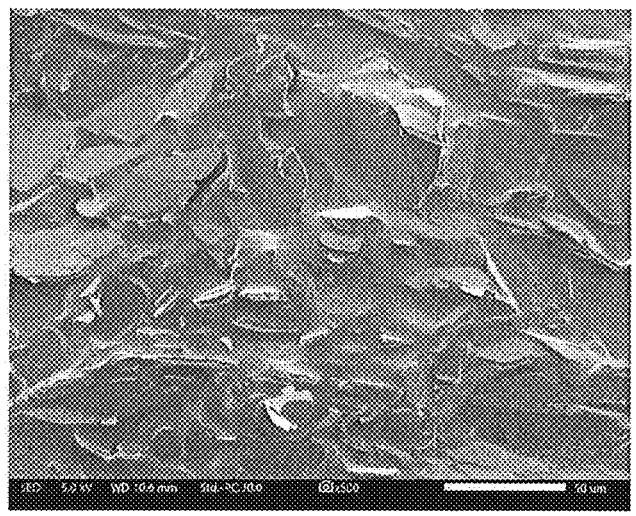
FIG. 5 is a cross-sectional photograph of a thermally conductive resin molded body of an example of the present invention.

A binder resin was prepared by mixing 2.4 g of a silicone polymer (containing a platinum catalyst) (DOWSIL CY 52-276 Part A manufactured by Dow Corning Toray Co., Ltd.) and 2.6 g of a silicone polymer (containing a cross-linking agent) (DOWSIL CY 52-276 Part B manufactured by Dow Corning Toray Co., Ltd.) using a self-rotating mixer. Then, 11.7 g of hexagonal boron nitride (HSL grade, median diameter: 30.0 μm, plate-like, manufactured by Dandong Chemical Engineering Institute) as an anisotropic thermally conductive filler shown in FIG. 3 was gradually added to 5.0 g of the binder resin and mixed with a stirring rod. The gradual addition of the anisotropic thermally conductive filler includes the first step and the second step of the present invention. The mixed composition was gently shaken and rotated by hand to produce composite resin granules shown in FIG. 4. The composite resin granules had an average diameter of 0.728 mm and an average aspect ratio of 1.38. Subsequently, 11.8 g of the composite resin granules were placed in a die with a diameter of 60 mm and pressed at a pressure of 1 t at room temperature. The temperature was increased to 100° C. while the pressure was being applied, and the composite resin granules were molded by hot press molding for 30 minutes, so that a thermally conductive resin molded body shown in FIG. 5 was produced. The thermally conductive resin molded body thus obtained had a thickness of 2.69 mm, a thermal conductivity in the thickness direction (t) of 4.2 W/m·K, and a thermal conductivity in the in-plane direction (s) of 5.1 W/m·K. The ratio (s/t) of the thermal conductivity in the in-plane direction (s) to the thermal conductivity in the thickness direction (t) of the thermally conductive resin molded body was 1.21. Moreover, the thermally conductive resin molded body had a specific gravity of 1.49.

Example 2

Figure 2:
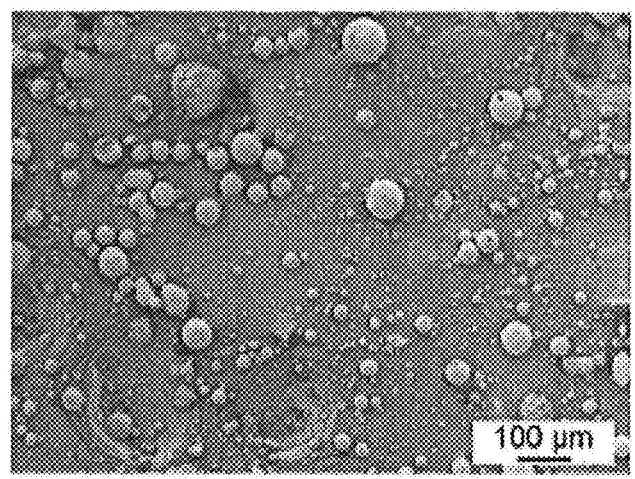
FIG. 2 is a photograph of a non-anisotropic thermally conductive filler used in an example of the present invention.

Composite resin granules were produced in the same manner as Example 1 except that 20.0 g of aluminum oxide (AZ35-125, median diameter: 35.0 μm, manufactured by NIPPON STEEL Chemical & Material Co., Ltd.) as a non-anisotropic thermally conductive filler shown in FIG. 2 was mixed with the same binder resin as Example 1, and that the amount of hexagonal boron nitride (the anisotropic thermally conductive filler) was changed to 10.0 g. The composite resin granules had an average diameter of 0.946 mm and an average aspect ratio of 1.26. Subsequently, 21.0 g of the composite resin granules were molded by press molding in the same manner as Example 1, so that a thermally conductive resin molded body was produced. The thermally conductive resin molded body thus obtained had a thickness of 3.11 mm, a thermal conductivity in the thickness direction (t) of 4.3 W/m·K, and a thermal conductivity in the in-plane direction (s) of 4.3 W/m·K. The ratio (s/t) of the thermal conductivity in the in-plane direction (s) to the thermal conductivity in the thickness direction (t) of the thermally conductive resin molded body was 1.00. Moreover, the thermally conductive resin molded body had a specific gravity of 2.22.

Example 3

Composite resin granules were produced in the same manner as Example 2 except that aluminum oxide (AL47H-STD, median diameter: 2.1 μm, manufactured by Showa Denko K.K.) as a non-anisotropic thermally conductive filler was used instead of aluminum oxide (AZ35-125, median diameter: 35.0 μm, manufactured by NIPPON STEEL Chemical & Material Co., Ltd.) as the non-anisotropic thermally conductive filler, and that the amount of hexagonal boron nitride (the anisotropic thermally conductive filler) was changed to 12.0 g. The composite resin granules had an average diameter of 0.979 mm and an average aspect ratio of 1.46. Subsequently, the composite resin granules were molded by press molding in the same manner as Example 2, so that a thermally conductive resin molded body was produced. The thermally conductive resin molded body thus obtained had a thickness of 3.23 mm, a thermal conductivity in the thickness direction (t) of 5.9 W/m·K, and a thermal conductivity in the in-plane direction (s) of 6.9 W/m·K. The ratio (s/t) of the thermal conductivity in the in-plane direction (s) to the thermal conductivity in the thickness direction (t) of the thermally conductive resin molded body was 1.17. Moreover, the thermally conductive resin molded body had a specific gravity of 2.26.

Example 4

Composite resin granules were produced in the same manner as Example 2 except that aluminum oxide (AL47H-STD, median diameter: 2.1 μm, manufactured by Showa Denko K.K.) as a non-anisotropic thermally conductive filler was used instead of aluminum oxide (AZ35-125, median diameter: 35.0 μm, manufactured by NIPPON STEEL Chemical & Material Co., Ltd.) as the non-anisotropic thermally conductive filler, that the amount of hexagonal boron nitride (the anisotropic thermally conductive filler) was changed to 11.0 g, and that the composite composition was treated with a blender. The composite resin granules had an average diameter of 0.356 mm and an average aspect ratio of 1.27. Subsequently, the composite resin granules were molded by press molding in the same manner as Example 2, so that a thermally conductive resin molded body was produced. The thermally conductive resin molded body thus obtained had a thickness of 2.97 mm, a thermal conductivity in the thickness direction (t) of 6.2 W/m·K, and a thermal conductivity in the in-plane direction (s) of 6.8 W/m·K. The ratio (s/t) of the thermal conductivity in the in-plane direction (s) to the thermal conductivity in the thickness direction (t) of the thermally conductive resin molded body was 1.10. Moreover, the thermally conductive resin molded body had a specific gravity of 2.33.

Example 5

Composite resin granules were produced in the same manner as Example 4 except that aluminum oxide (AKP-30, median diameter: 0.3 μm, manufactured by SUMITOMO CHEMICAL COMPANY, LIMITED) as a non-anisotropic thermally conductive filler was used instead of aluminum oxide (AL47H-STD, median diameter: 2.1 μm, manufactured by Showa Denko K.K.) as the non-anisotropic thermally conductive filler. The composite resin granules had an average diameter of 0.567 mm and an average aspect ratio of 1.47. Subsequently, the composite resin granules were molded by press molding in the same manner as Example 2, so that a thermally conductive resin molded body was produced. The thermally conductive resin molded body thus obtained had a thickness of 2.82 mm, a thermal conductivity in the thickness direction (t) of 7.0 W/m·K, and a thermal conductivity in the in-plane direction (s) of 7.0 W/m·K. The ratio (s/t) of the thermal conductivity in the in-plane direction (s) to the thermal conductivity in the thickness direction (t) of the thermally conductive resin molded body was 1.00. Moreover, the thermally conductive resin molded body had a specific gravity of 2.36.

Example 6

Composite resin granules were produced in the same manner as Example 4 except that 20.0 g of aluminum oxide (AL47H-STD, median diameter: 2.1 μm, manufactured by Showa Denko K.K.) as the non-anisotropic thermally conductive filler was changed to a mixture of 6.7 g of aluminum oxide (AL47H-STD, median diameter: 2.1 μm, manufactured by Showa Denko K.K.) as a non-anisotropic thermally conductive filler and 13.3 g of aluminum oxide (AKP-30, median diameter: 0.3 μm, manufactured by SUMITOMO CHEMICAL COMPANY LIMITED) as a non-anisotropic thermally conductive filler. The composite resin granules had an average diameter of 0.882 mm and an average aspect ratio of 1.39. Subsequently, the composite resin granules were molded by press molding in the same manner as Example 2, so that a thermally conductive resin molded body was produced. The thermally conductive resin molded body thus obtained had a thickness of 3.00 mm, a thermal conductivity in the thickness direction (t) of 6.5 W/m·K, and a thermal conductivity in the in-plane direction (s) of 7.2 W/m·K. The ratio (s/t) of the thermal conductivity in the in-plane direction (s) to the thermal conductivity in the thickness direction (t) of the thermally conductive resin molded body was 1.11. Moreover, the thermally conductive resin molded body had a specific gravity of 2.36.

Example 7

Composite resin granules were produced in the same manner as Example 6 except that the amount of hexagonal boron nitride (the anisotropic thermally conductive filler) was changed to 13.0 g. The composite resin granules had an average diameter of 0.429 mm and an average aspect ratio of 1.30. Subsequently, the composite resin granules were molded by press molding in the same manner as Example 2, so that a thermally conductive resin molded body was produced. The thermally conductive resin molded body thus obtained had a thickness of 3.15 mm, a thermal conductivity in the thickness direction (t) of 7.1 W/m·K, and a thermal conductivity in the in-plane direction (s) of 7.8 W/m·K. The ratio (s/t) of the thermal conductivity in the in-plane direction (s) to the thermal conductivity in the thickness direction (t) of the thermally conductive resin molded body was 1.10. Moreover, the thermally conductive resin molded body had a specific gravity of 2.33. Further, the thermally conductive resin molded body had a thermal diffusivity in the in-plane direction (s1) of $4.55 \times 10^{-6}$ (m²/s) and a thermal diffusivity in the in-plane direction (s2) of $4.53 \times 10^{-6}$ (m²/s). The ratio (s1/s2) of the thermal diffusivity in the in-plane direction (s1) to the thermal diffusivity in the in-plane direction (s2) of the thermally conductive resin molded body was 1.00.

Example 8

Composite resin granules were produced in the same manner as Example 4 except that 20.0 g of aluminum oxide (AL47H-STD, median diameter: 2.1 μm, manufactured by Showa Denko K.K.) as the non-anisotropic thermally conductive filler was changed to a mixture of 6.7 g of aluminum nitride (R15, median diameter: 15.5 μm, manufactured by Toyo Aluminium K.K.) as a non-anisotropic thermally conductive filler and 13.3 g of aluminum oxide (AKP-30, median diameter: 0.3 μm, manufactured by SUMITOMO CHEMICAL COMPANY, LIMITED) as a non-anisotropic thermally conductive filler. The composite resin granules had an average diameter of 0.430 mm and an average aspect ratio of 1.30. Subsequently, the composite resin granules were molded by press molding in the same manner as Example 2, so that a thermally conductive resin molded body was produced. The thermally conductive resin molded body thus obtained had a thickness of 3.23 mm, a thermal conductivity in the thickness direction (t) of 4.5 W/m·K, and a thermal conductivity in the in-plane direction (s) of 4.6 W/m·K. The ratio (s/t) of the thermal conductivity in the in-plane direction (s) to the thermal conductivity in the thickness direction (t) of the thermally conductive resin molded body was 1.05. Moreover, the thermally conductive resin molded body had a specific gravity of 2.27.

Comparative Example 1

The same types and amounts of silicone, aluminum oxide (the non-anisotropic thermally conductive filler), and hexagonal boron nitride (the anisotropic thermally conductive filler) as those in Example 7 were mixed with a mechanical stirrer. The mixture was rolled with even speed rolls into a width of 150 mm and a thickness of 3.00 mm, and then cured by heating at 100° C., so that a thermally conductive resin molded body was produced. The thermally conductive resin molded body thus obtained had a thermal conductivity in the thickness direction (t) of 5.8 W/m·K and a thermal conductivity in the in-plane direction (s) of 9.8 W/m·K. The ratio (s/t) of the thermal conductivity in the in-plane direction (s) to the thermal conductivity in the thickness direction (t) of the thermally conductive resin molded body was 1.69. Moreover, the thermally conductive resin molded body had a specific gravity of 2.29.

Comparative Example 2

First, 2.5 g of a silicone polymer (containing a platinum catalyst) (DOWSIL CY 52-276 Part A manufactured by Dow Corning Toray Co., Ltd.), 2.5 g of a silicone polymer (containing a crosslinking agent) (DOWSIL CY 52-276 Part B manufactured by Dow Corning Toray Co., Ltd.), 25.0 g of aluminum oxide (AL47H-STD, median diameter: 2.1 μm, manufactured by Showa Denko K.K.) as a non-anisotropic thermally conductive filler, and 47.5 g of aluminum oxide (AZ75-150, median diameter: 75 μm, manufactured by NIPPON STEEL Chemical & Material Co., Ltd.) as a non-anisotropic thermally conductive filler were mixed with a mechanical stirrer. The mixture was rolled with even speed rolls into a width of 150 mm and a thickness of 3.00 mm, and then cured by heating at 100° C., so that a thermally conductive resin molded body was produced. The thermally conductive resin molded body thus obtained had a thermal conductivity in the thickness direction (t) of 4.5 W/m·K and a thermal conductivity in the in-plane direction (s) of 4.6 W/m·K. The ratio (s/t) of the thermal conductivity in the in-plane direction (s) to the thermal conductivity in the thickness direction (t) of the thermally conductive resin molded body was 1.02. Moreover, the thermally conductive resin molded body had a specific gravity of 3.22.

Tables 1 and 2 show the results.

TABLE 1

| | Crushing | Average particle diameter (mm) | Average aspect ratio | Specific gravity | Thermal conductivity (W/m · K) Thickness (t) | Thermal conductivity (W/m · K) In-plane (s) | Ratio of thermal conductivity (s/t) |
|---|---|---|---|---|---|---|---|
| Ex. 1 | Not performed | 0.728 | 1.38 | 1.49 | 4.2 | 5.1 | 1.21 |
| Ex. 2 | Not performed | 0.946 | 1.26 | 2.22 | 4.3 | 4.3 | 1.00 |
| Ex. 3 | Not performed | 0.979 | 1.46 | 2.26 | 5.9 | 6.9 | 1.17 |
| Ex. 4 | Performed | 0.356 | 1.27 | 2.33 | 6.2 | 6.8 | 1.10 |
| Ex. 5 | Performed | 0.567 | 1.47 | 2.36 | 7.0 | 7.0 | 1.00 |
| Ex. 6 | Performed | 0.882 | 1.39 | 2.36 | 6.5 | 7.2 | 1.11 |
| Ex. 7 | Performed | 0.429 | 1.30 | 2.33 | 7.1 | 7.8 | 1.10 |
| Ex. 8 | Performed | 0.430 | 1.30 | 2.27 | 6.0 | 6.3 | 1.05 |
| Comp. Ex. 1 | — | — | — | 2.29 | 5.8 | 9.8 | 1.69 |
| Comp. Ex. 2 | — | — | — | 3.22 | 4.5 | 4.6 | 1.02 |

As can be seen from Table 1, in Examples 1 to 8, the thermal conductivity in the in-plane direction and the thermal conductivity in the thickness direction were 4.0 W/m·K or more, and the ratio (s/t) of the thermal conductivities was 0.6 or more and 1.5 or less. On the other hand, in Comparative Example 1, the ratio (s/t) of the thermal conductivities was 1.69 and the anisotropy of the thermal conductivities was high, although the specific gravity was low and the thermal conductivities were high. In Comparative Example 2, the specific gravity was high, although the thermal conductivities were high and the anisotropy of the thermal conductivities was low. The results confirmed that the thermally conductive resin molded bodies of the present invention had relatively high thermal conductivities, well-balanced directional properties of thermal conduction, and a low specific gravity.

TABLE 2

| X-axis thermal diffusivity in in-plane s1 direction (m²/s) | Y-axis thermal diffusivity in in-plane s2 direction (m²/s) | Ratio of thermal diffusivity (s1/s2) |
|---|---|---|
| Ex. 7 | 4.55 × 10⁻⁶ | 4.53 × 10⁻⁶ | 1.00 |

As can be seen from Table 2, in Example 7, the ratio (s1/s2) of the thermal diffusivity in the in-plane s1 direction to the thermal diffusivity in the in-plane s2 direction was 1.00. Thus, the results confirmed that the resin molded body had well-balanced thermal diffusivities.

INDUSTRIAL APPLICABILITY

The thermally conductive sheet of the present invention is useful as a heat dissipating material that is interposed between the heat generating member and the heat dissipating member of, e.g., electronic components such as LEDs and household electrical appliances, information and communication modules including optical communication equipment, and components mounted on vehicles. The thermally conductive sheet of the present invention is also useful as a heat dissipating material for electronic components including semiconductors.

DESCRIPTION OF REFERENCE NUMERALS

1 Container
2 Binder resin
3 Non-anisotropic thermally conductive filler
4 Anisotropic thermally conductive filler
5 Composite resin granules
6 Thermally conductive resin sheet
7 Boundary
s In-plane direction
t Thickness direction
11 Thermal conductivity measuring apparatus
12 Sensor
13a, 13b Thermally conductive sheet sample
14 Tip of the sensor
15 Electrode for applied current
16 Electrode for resistance value (temperature measurement electrode)

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A thermally conductive resin molded body comprising:
   composite resin granules comprising a binder resin and a thermally conductive filler,
   wherein the thermally conductive filler comprises at least an anisotropic thermally conductive filler,
   a composition containing the binder resin and the thermally conductive filler is formed into granules,
   particles of the anisotropic thermally conductive filler are oriented in random directions,
   an average diameter of the composite resin granules is 0.01 mm or more and 5 mm or less,
   the composite resin granules are molded by at least one molding process selected from the group consisting of injection molding, extrusion molding, press molding, and vacuum press molding,
   the composite resin granules in the molded body are compressed and deformed so that each granule has a shape with corners, and boundaries between the composite resin granules are observable, and
   a ratio (s/t) of a thermal conductivity in an in-plane direction (s) to a thermal conductivity in a thickness direction (t) of the thermally conductive resin molded body is 0.6 or more and 1.5 or less.

2. The thermally conductive resin molded body according to claim 1, wherein a thermal conductivity in a thickness direction of the thermally conductive resin molded body is 4.0 W/m·K or more and 300 W/m·K or less.

3. The thermally conductive resin molded body according to claim 1, wherein a ratio (s1/s2) of a thermal diffusivity in a direction (s1) to a thermal diffusivity in a direction (s2) of the thermally conductive resin molded body is 0.8 or more and 1.2 or less, where s1 represents any in-plane direction and s2 represents a direction that is along the in-plane direction and is perpendicular to the direction (s1).

4. The thermally conductive resin molded body according to claim 1, wherein the thermally conductive filler further comprises a non-anisotropic thermally conductive filler.

5. The thermally conductive resin molded body according to claim 1, wherein the anisotropic thermally conductive filler is at least one selected from the group consisting of hexagonal boron nitride, graphite, and graphene.

6. The thermally conductive resin molded body according to claim 1, wherein the anisotropic thermally conductive filler has at least one shape selected from the group consisting of plate, scale, rod, needle, and fiber.

7. The thermally conductive resin molded body according to claim 4, wherein the non-anisotropic thermally conductive filler is at least one selected from the group consisting of carbon black, aluminum oxide, aluminum nitride, silicon nitride, magnesium oxide, and silicon carbide.

8. The thermally conductive resin molded body according to claim 4, wherein the non-anisotropic thermally conductive filler is in at least one of a spherical form and a crushed form.

9. The thermally conductive resin molded body according to claim 4, wherein the binder resin is a thermosetting resin.

* * * * *